(12) United States Patent
Dremlyuga et al.

(10) Patent No.: US 7,357,515 B2
(45) Date of Patent: Apr. 15, 2008

(54) METHOD AND DEVICE FOR GENERATING SPATIAL IMAGES

(76) Inventors: Anton A. Dremlyuga, Ul. Lesnaya 10-153, Moscow-Reutov (RU) 143952; Andrey V. Kokhanov, 1st Panovsky proezd 1-4 116, Ljubertzy (RU) 140012; Georgy I. Zheltov, Ul. Zakharova 30-8, Minsk (BY) 22034

( * ) Notice: Subject to any disclaimer, the term of this patent is extended or adjusted under 35 U.S.C. 154(b) by 48 days.

(21) Appl. No.: 11/230,733

(22) Filed: Sep. 20, 2005

(65) Prior Publication Data

US 2006/0012541 A1    Jan. 19, 2006

Related U.S. Application Data

(63) Continuation of application No. PCT/BY03/00013, filed on Nov. 13, 2003.

(30) Foreign Application Priority Data

Mar. 20, 2003    (BY) ............................... A 20030251

(51) Int. Cl.
*G03B 21/14*    (2006.01)
(52) U.S. Cl. ..................... 353/62; 353/122; 353/121

(58) Field of Classification Search ............... 353/37, 353/30, 102, 122; 372/76; 345/37, 41, 62, 345/6, 139, 32, 419; 359/326–332
See application file for complete search history.

(56) References Cited

U.S. PATENT DOCUMENTS

| 4,870,485 | A | * | 9/1989 | Downing et al. | ............. | 348/42 |
| 5,871,267 | A | * | 2/1999 | Wende | ........................ | 353/122 |
| 5,943,160 | A | * | 8/1999 | Downing | .................... | 359/326 |
| 6,466,184 | B1 | | 10/2002 | Scheps et al. | | |

FOREIGN PATENT DOCUMENTS

| RU | 2055315 | 2/1996 |
| WO | WO 00/11513 A | 3/2000 |

* cited by examiner

*Primary Examiner*—William C. Dowling
(74) *Attorney, Agent, or Firm*—Houston Eliseeva LLP

(57) ABSTRACT

The invention is related to methods and devices for generating spatial images. The method comprises forming at least two directional radiation beams in a selected viewer's plane, each of the at least two directional radiation beams having a power from 0.05 to 10 of a human eye differential threshold for a current viewing condition, and directing at least two directional radiation beams to intersect and form a light spot at a crossover point, the light spot having an angular dimension corresponding to an angular resolution of a human eye and making the light spot visible from any point within the viewer's plane. Imaging is provided by means of a spatial displacement of a crossover point with an appropriate variation of brightness and/or color of said point, if required.

20 Claims, 3 Drawing Sheets

METHOD AND DEVICE FOR GENERATING SPATIAL IMAGES

RELATED APPLICATIONS

This application is a continuation application of PCT application serial number PCT/BY2003/000013 filed on Nov. 13, 2003 (which was published in English under PCT Article 21(2) as International Publication No. WO 2004/083936 A1) which in turn claims priority to Belarus patent application number BY a 20030251 filed on Mar. 20, 2003, both of which are incorporated herein by reference in their entirety.

FIELD OF THE INVENTION

The invention is related to methods and devices for generating spatial images and is intended for use in the field of advertising, show-business, variety, etc. with no special measures being required for reflecting or scattering the optical radiation both in the open air and in closed space.

BACKGROUND OF THE INVENTION

Lasers at present are widely used in the field of advertising, show-business, variety, etc. for generating images on specially prepared media for reflecting or scattering the optical radiation (screens, clouds of smoke, vapor, water jets etc.).

Known is a method of generating space images [USSR inventor's certificate No. 1817575, IC7 G02B 27.22, published 27 Aug. 1995.] by means of graphic drawing. According to this method, the object is sub-divided into individual dots with each dot being imaged in the form of a circular groove on the carrier, said groove being illuminated by a parallel light beam. A viewer's eye can observe only two opposite dots of the groove, so for each eye there is generated its own image. To implement the method described special carriers with the images pre-recorded thereon are needed, this greatly limiting the possibilities of the method.

The nearest Prior Art reference to a method filed is a method of generating space images using the radiation beams [Patent of the Russian Federation No. 2055315, IC7: C01C11/00, 11/06, G02B27/22, published 27 Feb. 1996]. Spatial modulation of the radiation beams is provided by means of a stereo multiplicity of the image carriers. The modulated radiation beams are projected in sequences-cycles on the retina of the viewer's both eyes with the repetition rate of the modulated radiation beams of (2 to 50)N, Hz, where N is the dimension of a stereo multiplicity of the image carriers. To view images according to this method there is needed a screen, e.g. a display screen this in its turn limiting the possibilities of using this method for a large number of the viewers.

Another known device is a laser computer-aided system "Compact-Vita" [Prospectus of State Unitary Enterprise "Scientific-Production Union Astorphysika", Russia, A laser computer-aided system "Compact-Vita"] comprising only one source of directional radiation with a power supply unit and a device for controlling the radiation beam parameters with the control input of the latter connected to an appropriate output of the control unit. To generate images with the help of the device described there is also needed a screen.

SUMMARY OF THE INVENTION

It is the aim of the present invention to design a method and a device for generating spatial images when no use is made of either image carriers or special measures for reflecting or scattering the optical radiation.

The above-set aim in a method of spatial imaging consisting in forming and supplying into the selected space region of a directional visible radiation beam, is achieved by means of forming at least 2 directional radiation beams, each having the power from 0.05 to 10 of the human eye differential thresholds for the current viewing conditions, with said directional radiation beams being supplied into the selected space region in such a manner that said beams would be intersected at one point within said region with said crossover point of all radiation beams being located within said region.

The angular dimension of a crossover point should be visible from any point within said region and correspond to the angular resolution of the human eye.

Each of the directional radiation beams is formed taper-shaped with the top of said taper being located at said crossover point of all directional radiation beams.

Directional radiation may be of either continuous or pulsed type, most preferably a laser radiation.

Imaging is provided by means of a spatial displacement of a crossover point with an appropriate variation of brightness and/or color of said point, if required.

Brightness control of a crossover point of all radiation beams is effected either by means of simultaneously varying the power of all radiation beams or by means of varying the number of simultaneously formed radiation beams, also by asynchronizing the radiation pulses due to introducing a time delay between the pulses of the radiation beams formed as pulsed ones.

The spectra of all radiation beams may be identical.

Image color control can be provided by forming the radiation beams with different spectra, e.g. in red, green or blue spectral regions as well as by varying the power and/or the number of the radiation beams formed simultaneously in each spectral region.

The above-set aim in a device for generating spatial images comprising a control unit, at least one source of directional radiation with a power supply unit and a device for controlling the radiation beam parameters with the control input of the latter connected to an appropriate output of the control unit, is achieved by means of said device comprising at least two sources of directional radiation with the appropriate power supply units and the devices for controlling the radiation beam parameters which are located along the border of the region with the optimal image viewing conditions provided therein such that all output directional radiation beams would be intersected at one crossover point within said region at the angle of 30-140°.

The angular dimension of a crossover point is visible from any point within said region and corresponds to the angular resolution of the human eye.

Each radiation source is preferably supplied with an optical system for forming a taper-shaped beam from an output radiation in such a manner that an output eye of the optical system would form the base of said taper with the top of said taper formed by said crossover point of the directional radiation output beams.

Preferably lasers are used as the radiation sources.

Each device for controlling the radiation beam parameters is preferably made in the form of a controllable optical deflector for the displacement of said crossover point of the radiation beams.

A controlled attenuator having its signal input coupled to an appropriate output of the control unit is connected in series along the radiation beam to each of said devices for controlling the radiation beam parameters.

Each respective power supply unit is coupled to the appropriate outputs of the control unit through a respective external synchronization device.

At least part of the radiation sources may be made pulsed ones, and those of external synchronization devices which are connected to the power supply units of the radiation sources made pulsed ones are supplied with a controllable time delay.

The radiation sources can be intended for forming the radiation in more than one spectral band, preferably in the red, green and blue spectral regions.

A method and a device filed are illustrated in the accompanying drawings.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
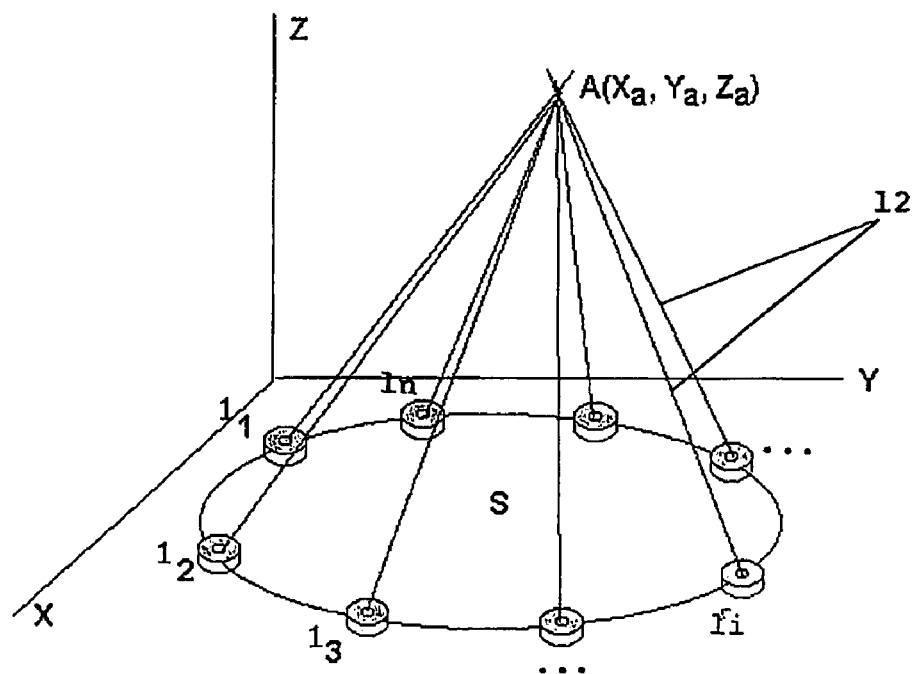
FIG. 1 is a schematic spatial representation of a device filed.
Figure 2:
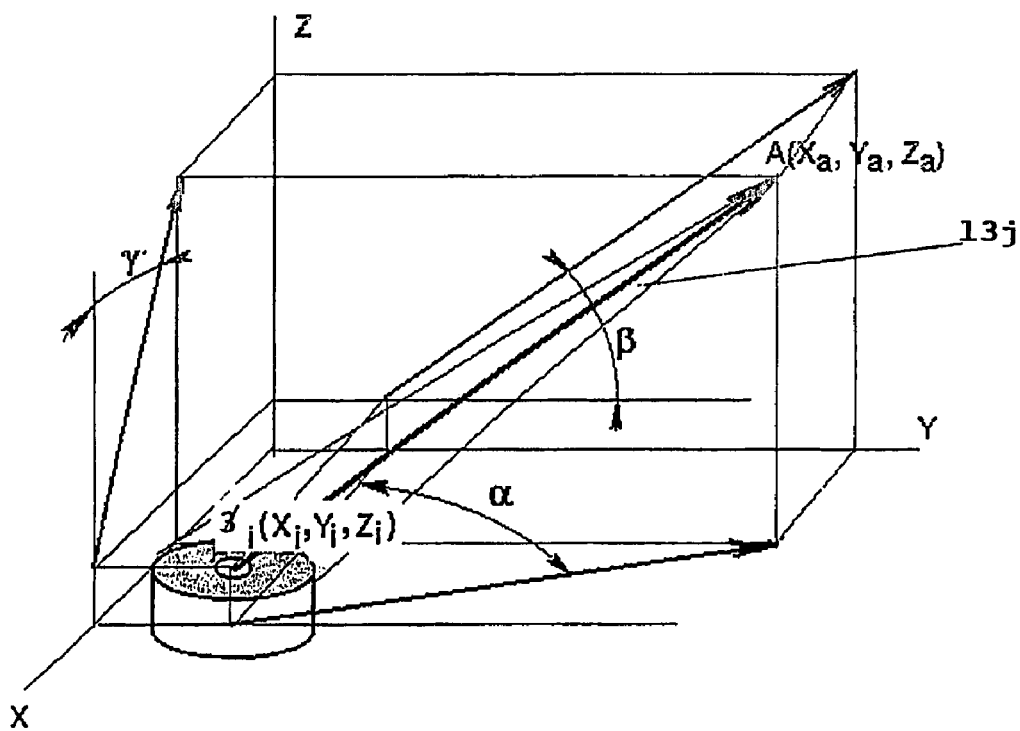
FIG. 2 is a schematic representation of a spatial location for one of the components of a device filed.
Figure 3:
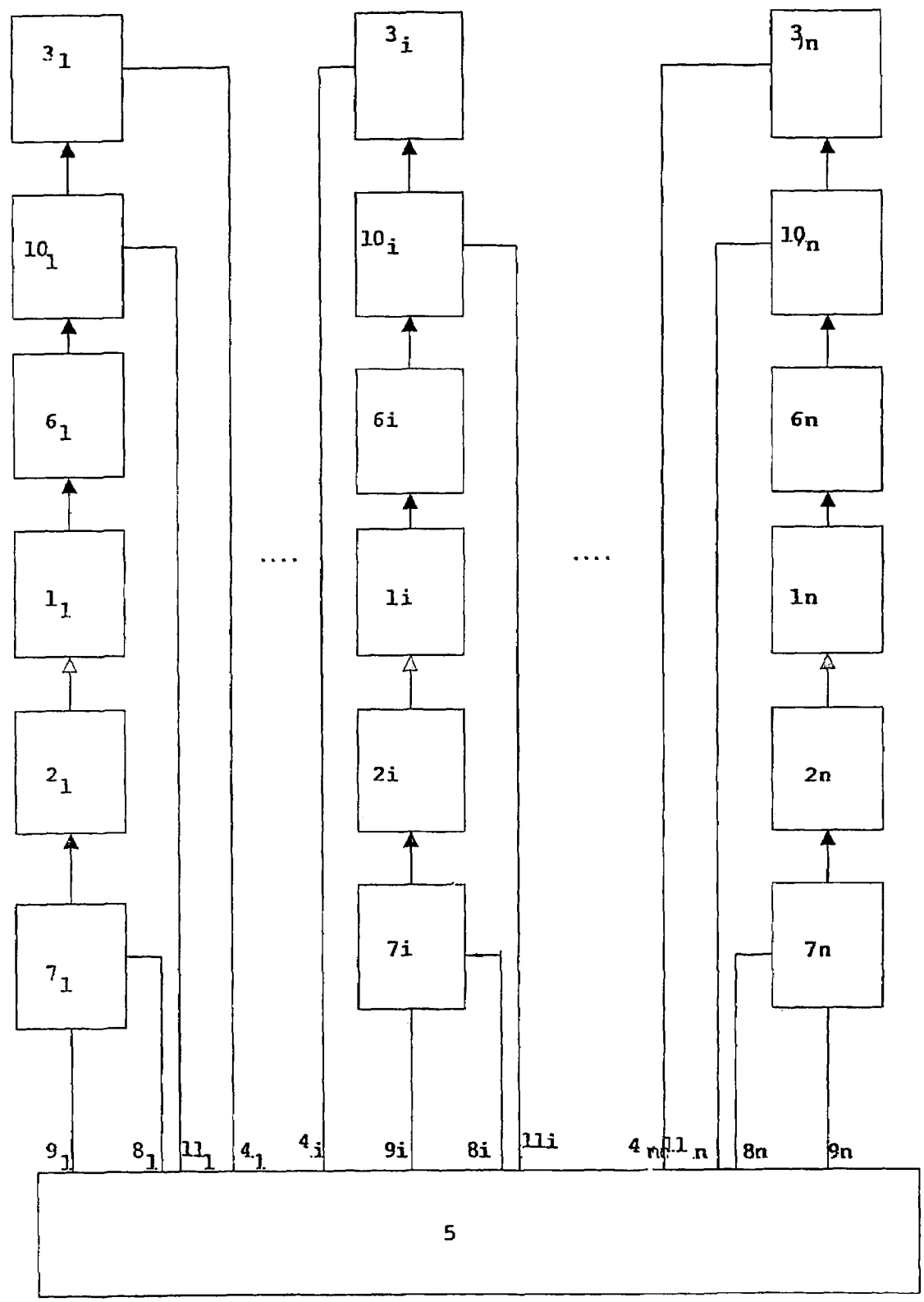
FIG. 3 is a block diagram of a device filed.

A device filed is schematically shown in FIGS. 1, 2, 3. The principal part of the device is formed by the source $1_1$-$1_n$ of directional radiation supplied with the appropriate power supply units $2_1$-$2_n$ and the controllable optical deflectors $3_1$-$3n$ (an output eye of said deflectors is arbitrary shown in FIG. 2), said optical deflectors used as the devices for controlling the parameters. A signal input of each of said deflectors $3_1$-$3n$ is coupled to an appropriate one of the signal outputs $4_1$-$4n$ of the control unit 5 for controlling the spatial position (See FIG. 3). To make the radiation beam taper-shaped each of the sources $1_1$-$1n$ is supplied with an appropriate optical forming system $6_1$-$6n$.

Each of the power supply units $2_1$-$2n$ via an appropriate one of the external synchronization devices $7_1$-$7n$ with a controllable time delay is coupled to both an appropriate one of the synchronization signal outputs $8_1$-$8n$ and to an appropriate one of the signal outputs $9_1$-$9n$ of the control unit 5 for controlling the delay.

A controlled attenuator $10_1$-$10n$ is connected serially along the radiation beam, preferably before each of the deflectors $3_1$-$3n$. The signal input of said attenuator $10_1$-$10n$ is coupled to an appropriate one of the outputs $11_1$-$11n$ of the control unit 5 for controlling signal for the radiation power.

The present description provides the most optimal and preferable manner of connecting the devices along the radiation beam. It should be noted, however, that the connection manner of an optical forming system 6, an optical deflector 3 and an attenuator 10 can be changed depending on the particular conditions and the type of the equipment in use. Thus, for example, the optical forming system 6 can be structurally combined with the radiation source 1, if required, the attenuator 10 can be positioned after the deflector 3 etc.

A control unit 5 can be made using, for example, a computer or any other programmable device.

The method filed can be implemented in the operation of the above-described device in the following way.

A number n (n>2) of the sources 1 of directional radiation, e.g. lasers, operating in the visible spectral range are positioned along the perimeter of the region with the optimal image viewing conditions provided therein (further referred to as the viewer's plane S in FIG. 1).

The generated image can be also viewed outside the borders of the S region, but the visual perception will be worse the further from the region border.

The radiation beams $12_1$-$12n$ from all the sources $1_1$-$1n$ are directed to one point A in the image space with the coordinates of Xa, Ya, Za (Point A in FIG. 1 further referred to as the targeting point).

The power of each of the radiation beams $12_1$-$12n$ is chosen in the range from 0.05 to 10 of the human eye differential thresholds for the current viewing conditions. The above power value is chosen on the assumption of forming a light spot at the most distant from the radiation source targeting point A (within the limits of the generated tree-dimensional image) in such a manner that a visible angular dimension of said spot would correspond to the angular resolution of an average human eye.

To increase the spot brightness and to improve the image definition each radiation beam $12_1$-$12n$ is preferably-taper-shaped $13_1$-$13n$ (See FIG. 2) by means of an appropriate optical forming system $6_1$-$6n$ in such a manner that the base of each taper would be made by an output eye of a respective optical forming system $6_1$-$6n$ (or an optical deflector $3_1$-$3n$) with its top made by the targeting point A. The taper-shaped radiation beams $13_1$-$13n$ from all of the radiation sources $1_1$-$1n$ are directed to the image space S such that the tops of all tapers would be intersected at one crossover point A with the coordinates of Xa, Ya, Za.

The parameters of all optical forming systems $6_1$-$6n$ are also chosen on the assumption of forming a light spot at the targeting point A such that the angular dimension of said light spot visible from any point in the viewer's plane would correspond to the angular resolution of an average human eye. This value makes up one angular minute or $2.94 \times 10^{-4}$ radian [D. Sliney, M. Wolbarsht. Safety with Lasers and other Optical sources. A Comprehensive Handbook. Plenum Press. New York and London, 1980].

For example, should the original angular divergence of a laser radiation beam $12i$ make up the value of 5 angular minutes, it is to be 5-times decreased with the help of an optical forming system $6i$. This task is solved by means of a 5-fold telescopic system, according to e.g. Keplerian or Galilean schemes [H. Ebert. Phisikalishes Taschenbuch. Friedr. Vieweg und Sohn. Braunschweif, 1957.; G. S. Lansberg. Optica. Science, M., 1976]. In this case the original diameter of a laser beam is 5-times increased forming the above-described taper base $13i$ at the output of an optical system $6i$. The minimum angular dimension of a light spot in the focus of the optical forming system $6i$ (the taper top—point A) visible from the point in the viewer's plane positioned in the vicinity of an output eye of the optical forming system will make up approximately one angular minute.

The use of an optical forming system of the type described makes it possible to provide a sharp improvement (25-times as in the case considered) of the light spot brightness and image definition.

The energy characteristics of each radiation source $1i$ are chosen according to the following criteria.

The mean power P (W) of each of sources 1 of either continuous or pulsed visible radiation (with the minimum duration of each individual pulse of 0.1 sec) is chosen such that the irradiance H (W/m$^2$) at the targeting point A will approximate the human eye differential threshold (from 0,5 to 10 thresholds) under the lighting and atmospheric conditions (dust content, humidity) corresponding to the image viewing conditions.

The power P(W) or the pulse energy W(J) of the above-mentioned radiation sources for the night conditions can be calculated as follows:

$$P_i \cong \frac{(4\pi L^2) H thereshold}{sK} \quad (1)$$

where $P_i$, W is the power of an individual radiation source (symbol i indicates the ordinal number of the radiation source in question, $1 < i < n$;

L, cm is the distance from an output eye of the optical forming system to the targeting point A;

$H_{threshold}$, W/cm$^2$ is the irradiance of the human eye retina corresponding to the differential threshold in the darkness. According to the available data [D. Sliney] it makes up approximately $2.10 W^{-9}/cm^2$;

s is a fraction of a light beam in the visible spectral range scattered by an atmospheric air layer of the unity width. According to the data available [Lansberg, p. 587] the value of s makes up $2.7 \cdot 10^{-7}$ under the normal atmospheric pressure and temperature for the layer width of 1 cm;

K is a relative irradiance increase at the section from the external cornea surface to the retina defined by the light beam focusing of the human eye optics. The diameter of a human eye pupil of 0.6 cm corresponding to the adaptation under conditions of a small (night) light provides the value of K of approximately. $3.5 \cdot 10^5$ [D. Sliney].

EXAMPLE

The maximum distance from the either continuous or pulsed source of visible radiation (with the minimum duration of each individual pulse of 0.1 sec) to the edge of the generated image is of L=50 m ($5 \cdot 10^3$ cm), $s=2.7 \cdot 10^{-7}$, $K=3.5 \cdot 10^5$.

The minimum power of each individual radiation source is to be $$P_i = \frac{(4\pi \cdot 2.5 \cdot 10^7) 2 \cdot 10^{-9}}{2.7 \cdot 10^{-7} \cdot 3.5 \cdot 10^5} = 6.65(W)$$

For visible radiation sources 1 of the pulsed type with the individual pulse duration within from $10^{-7}$ to 0.1 sec the energy characteristics of each radiation source $1i$ are chosen according to the following criteria:

The energy per individual pulse W, (J) for the visible radiation sources 1 of the mentioned type is chosen such that the energy exposure E (J/cm) in the point A would be equal to the differential threshold of the human eye under the lighting and atmospheric conditions (dust, humidity) corresponding to the viewing conditions.

The radiation energy of the pulse Wi (J) (irrespective of the pulse duration within the above-mentioned range) should correspond to the energy amount accumulated by the retina receptors during the time of about 0.1 sec with the retina irradiation corresponding to the differential threshold $H_{thr}$. Thus, the sought value of the radiation energy Wi of each radiation source is numerically equal to $$W_i(J) = 0.1 P_i(W),$$

where Pi is calculated according to the formula 1.

The validity of formula (1) has been confirmed by the authors' measurements (See the implementation example).

The power P, W or the energy per pulse W, J of the above-mentioned radiation sources under the day or dusk lighting will be higher than the one that has been calculated according to the formula (1). This surplus value depends not only on the illumination level but also on the atmospheric conditions (humidity, mist, dust etc.). The surplus factor is chosen on condition of forming a light contrast between the targeting aim and the radiation dissipated by each of the beams 13 which is maximum perceived by the eye of the viewer positioned in the plane S.

Image generation is provided by the spatial displacement of the targeting point A, which is common for all of the sources. Image brightness and, if required, image color can be controlled simultaneously.

Should a three-dimensional Cartesian coordinate system be used (FIGS. 1,2), and the output eye center location of an optical deflector $3i$ of an i-numbered radiation source $1i$ as well as the targeting point A be pre-set by the coordinates (Xi,Yi,Zi) and (Xa, Ya, Za) respectively (See FIG. 2), the algorithm for controlling the radiation directions of the above-mentioned source can be described, for example, by the formulas:

$$\cos\alpha = \frac{X_a - X_i}{\sqrt{(X_a - X_i)^2 + (Y_a - Y_i)^2}} \quad (2)$$

$$\cos\beta = \frac{Y_a - Y_i}{\sqrt{(Y_a - Y_i)^2 + (Z_a - Z_i)^2}}$$

$$\cos\gamma = \frac{Z_a - Z_i}{\sqrt{(Z_a - Z_i)^2 + (X_a - X_i)^2}},$$

where $\alpha, \beta, \gamma$ are the angles between the coordinate plane projections of a section connecting an output eye $6i$ of an optical deflector of an i-numbered radiation source with the targeting aim A (FIG. 2) and the axis of X,Y,Z coordinates respectively. These angles are the functions of a targeting point position for each radiation source and define the algorithm for controlling the directions of light beams in three coordinate planes for the displacement of said point in the space.

The choice of speed for the displacement of the targeting point A is based on the well-known principles of the frame generation, frame frequency etc. which have been designed in detail, for example, in television technique. (The minimum frame frequency is to be of 20 Hz. The preferable angular distance between the lines of a flat image or between the imaging planes of a 3-dimensional image is to be selected as corresponding to the angular resolution of an average human eye.)

The direction of the radiation beam for each source 1 is controlled by means of an appropriate optical deflector 3. An individual beam 12 can be controlled for example by means of a laser computer-aided system "Compact-Vita", [Prospectus of State Unitary Enterprise "Scientific-Production Union Astorphysika", Russia, A laser computer-aided system "Compact-Vita"]. The number of the systems in use may be proportional to the number of the radiation beams being formed.

The intensity control of the viewed image scattered by the atmosphere at the targeting point (an eye-perceived brightness of the point) is provided by the following methods:

1) Simultaneous control of the power of all radiation sources 1 by means of the attenuators 10 under the control of the control unit 5. The above-mentioned laser computer-aided system "Compact-Vita" makes it possible to implement the power control of an individual beam 12. The number of the systems in use may be proportional to the number of the radiation beams being formed.

2) Changing the number of simultaneously switched-on radiation sources 1. To do this the control unit 5 in accordance with its own program forms the control signal at each of its outputs $8_1$-$8n$ connected to the first signal inputs of the appropriate external synchronization devices $7_1$-$7n$. In accordance with the control signal received the devices $7_1$-$7n$ switch on the power supply units $2_1$-$2n$.

3) When using visible radiation sources 1 of the pulsed type with the duration of individual pulses within from $10^{-7}$ to 0.1 sec it is possible to control the brightness of point A by means of asynchronizing the radiation pulses due to introducing a time delay within from 0 to 0.2 sec between the pulses radiated by different sources. To do this the control unit 5 in accordance with its own program forms the control signal at each of its outputs $9_1$-$9n$ connected to the second signal inputs of the appropriate external synchronization devices 71-7n with a controllable time delay. The devices $7_1$-$7n$ switch on the power supply units $2_1$-$2n$ with the time delay pre-set in accordance with the control signal received.

Should the spectra of all radiation sources be identical, the color of the generated image will be a monochrome one.

Image color control can be provided by means of forming the radiation beams with different spectra. In this case the color observed at the targeting point differs from the original ones and is defined by the color diagram [V. V. Meshkov, A. B. Matveev. The basic Principles of Light Technique. Energoatomizdat, M., 1985]. To change the image color it is possible as described above to vary the power and/or the number of simultaneously formed radiation beams.

In a particular case the sources I may be made in such a manner that one group of the sources 1 provides radiation in the red spectral region, the second group in the green one and the third group in the blue one. An arbitrary choice of the color perceived by a human eye at the targeting point throughout the visible spectral region can be provided by means of varying the power within the groups (on the analogy with a TV screen, for example).

The invention filed can be best illustrated by means of the following non-limiting implementation example.

Implementation Example

The radiation of a continuously-operating argon laser corresponding to the blue-green spectral regions (the wavelengths of 514 and 480 nm) with the divergence of about 6 angular minutes and the controlled power from 0 to 5 W was converted into a parallel beam having the diameter of 8 mm (the original laser beam diameter of I mm, telescope of the type "Keplerian tube", 8×). This beam was divided into six beams of approximately equal power with the help of a prism-shaped image divider. The beams were directed to the six spherical (positive sphere) mirrors positioned on a support at the angles of a regular hexagon encircled by a circumference having the diameter of 60 cm. Taper-shaped light beams focussed after being reflected by the mirrors are directed with the help of the same spherical mirrors into one point (See FIG. 4). Thus, said mirrors serve a double function of the radiation sources and the forming systems. With the curvature radius of the mirrors equal to +120 cm the distance from the surface of the mirrors to the crossing of a taper-shaped beam (herein referred to as a beam crossover point) made up approximately 60 cm. A light spot diameter at the crossover point made up 0.4+0.1 mm. The spatial position of a crossover point was varied by means of both the slope control of the spherical mirrors and the rotation of the above-mentioned support on the whole.

Figure 4:
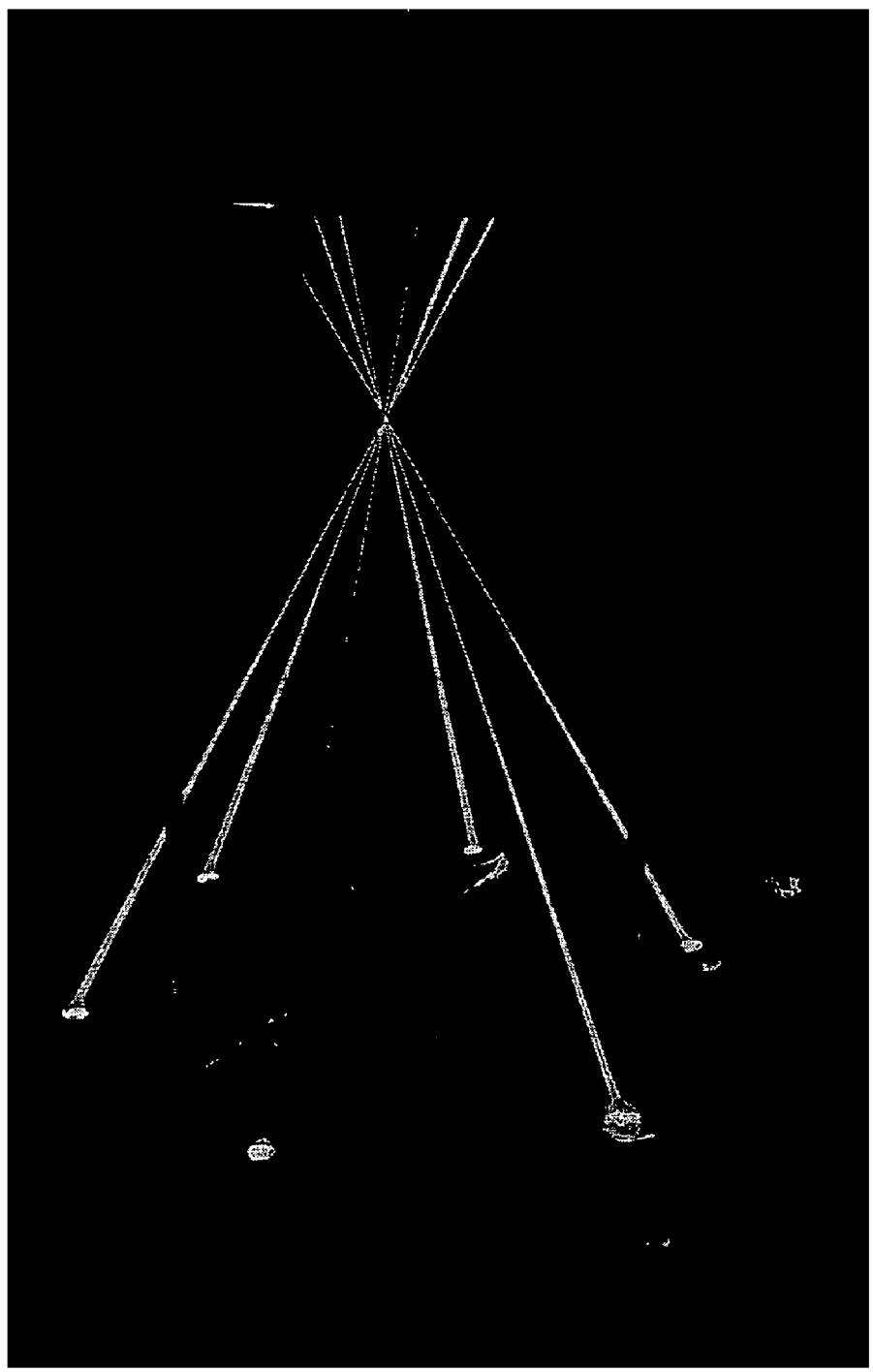
FIG. 4 is a photo of the image generated in the implementation example.

It can be seen in FIG. 4 that the slope angle of all the six light beams in relation to the support surface was of 60°. The power of each light beam corresponding to the differential threshold on the dark background under the dusk lighting in the laboratory room made up the value of 0.04 W. This value was recorded by five viewers with a normal eyesight after 20 minutes of adaptation. The estimated power of each light beam calculated by formula (1) is equal to 0.02 W. The calculated and experimental estimations are sufficiently close to one another.

As it is seen in FIG. 4 and also has been recorded as mentioned above by the five viewers, the crossover point of the beams is perceived much brighter than the radiation scattered by the individual beams with said point when displaced being the basis for generating spatial images.

What is claimed is:

1. A method of generating spatial images, the method comprising:

forming at least two directional radiation beams in a selected viewer's plane, each of the at least two directional radiation beams having a power from 0.05 to 10 of a human eye differential threshold for a current viewing condition; and directing the at least two directional radiation beams to intersect and form a non-ionizing dissipation light spot at a crossover point, the dissipation light spot having an angular dimension corresponding to an angular resolution of a human eye and making the non-ionizing dissipation light spot visible from any point within the viewer's plane.

2. The method as in claim 1, wherein each of the directional radiation beams is formed taper-shaped with the top of said taper being located at the crossover point of the directional radiation beams.

3. The method as in claim 1, wherein the directional radiation is continuous radiation.

4. The method as in claim 1, wherein said directional radiation is pulsed radiation.

5. The method as in claim 1, wherein said directional radiation is laser radiation.

6. The method as in claim 1, further comprising generating an image by spatially displacing the crossover point.

7. The method as in claim 6, further comprising varying brightness of the non-ionizing dissipation light spot.

8. The method as in claim 7, wherein varying the brightness of the non-ionizing dissipation light spot comprises simultaneously varying the power of all radiation beams.

9. The method as in claim 7, wherein varying the brightness of the non-ionizing dissipation light spot comprises varying the number of radiation beams.

10. A method of-generating spatial images, the method comprising:
    forming at least two directional radiation beams in a selected viewer's plane, each of the at least two directional radiation beams having a power from 0.05 to 10 of a human eye differential threshold for a current viewing condition;
    directing the at least two directional radiation beams to intersect and form a non-ionizing dissipation light spot at a crossover point, the non-ionizing dissipation light spot having an angular dimension corresponding to an angular resolution of a human eye and making the non-ionizing dissipation light spot visible from any point within the viewer's plane;
    generating an image by spatially displacing the crossover point; and
    varying brightness of the non-ionizing dissipation light spot,
    wherein forming the at least two directional radiation beams comprises pulsed radiation beams and wherein varying the brightness of the crossover point comprises asynchronizing radiation pulses by introducing a time delay between the radiation pulses.

11. The method as in claim 1, wherein all radiation beams have the same spectra.

12. The method as in claim 1, further comprising controlling a color of the image by forming the directional radiation beams with different spectra and by varying the power and/or the number of the directional radiation beams.

13. A device for generating spatial images comprising:
    at least two sources of directional radiation beams coupled to their respective power supply units and their respective devices for controlling directional radiation beam parameters;
    a control unit coupled to the devices for controlling the directional radiation beam parameter, wherein an output of the control unit serves as an input to the devices for controlling; and
    the devices for controlling the directional radiation beam parameters being disposed along the perimeter of a viewer's plane with selected viewing conditions, the viewing conditions being such that all directional radiation beams intersect at a crossover point at an angle from about 30 to about 140° forming a non-ionizing dissipation light spot, the non-ionizing dissipation light spot having an angular dimension corresponding to an angular resolution of a human eye and making the non-ionizing dissipation light spot visible from any point within the viewer's plane.

14. The device as in claim 13, wherein each source of directional radiation beams comprises an optical system for forming taper-shaped directional radiation beams from directional radiation beams in such a manner that an output eye of the optical system forms the base of the taper, while the top of the taper is formed by the crossover point.

15. The device as in claim 13, wherein the sources are laser sources.

16. The device as in claim 13, wherein each device for controlling the radiation beam parameters is a controllable optical deflector for displacing the crossover point.

17. The device as in claim 13, further comprising a controlled attenuator connected in series to each of the devices for controlling the radiation beam parameters, the controlled attenuator having its signal input coupled to a respective output of the control unit.

18. The device as in claim 13, wherein each power supply unit is coupled to the appropriate outputs of the control unit through a respective external synchronization device.

19. The device as in claim 18, wherein the external synchronization devices that are connected to the power supply units of the sources of directional radiation beams in the form of pulsed radiation comprise a time delay controller.

20. The device as in claim 13, wherein the sources of directional radiation beams generate the radiation in more than one spectral band.

* * * * *